March 30, 1926.
A. KADOW
1,578,442
MANUFACTURE OF GLASSWARE
Filed March 27, 1922    2 Sheets-Sheet 1
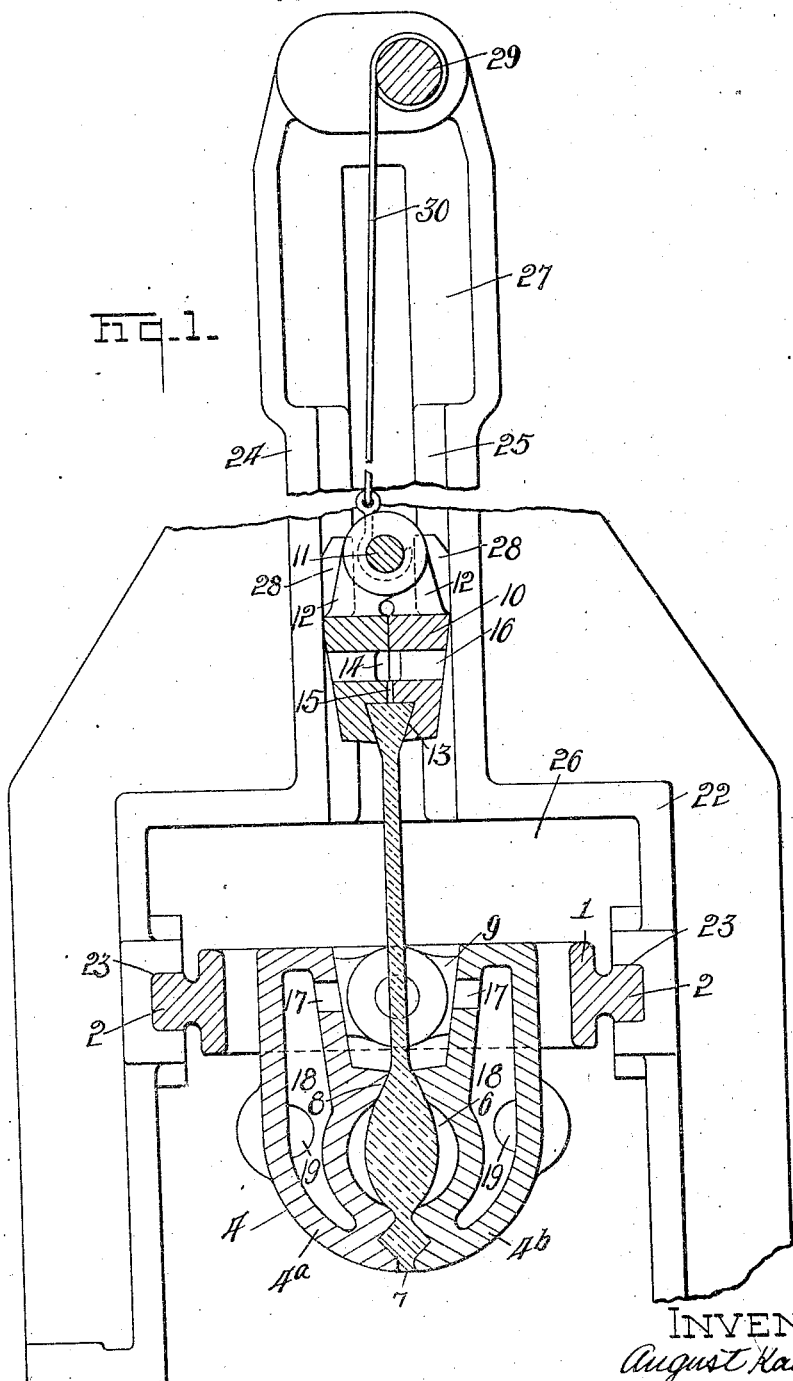

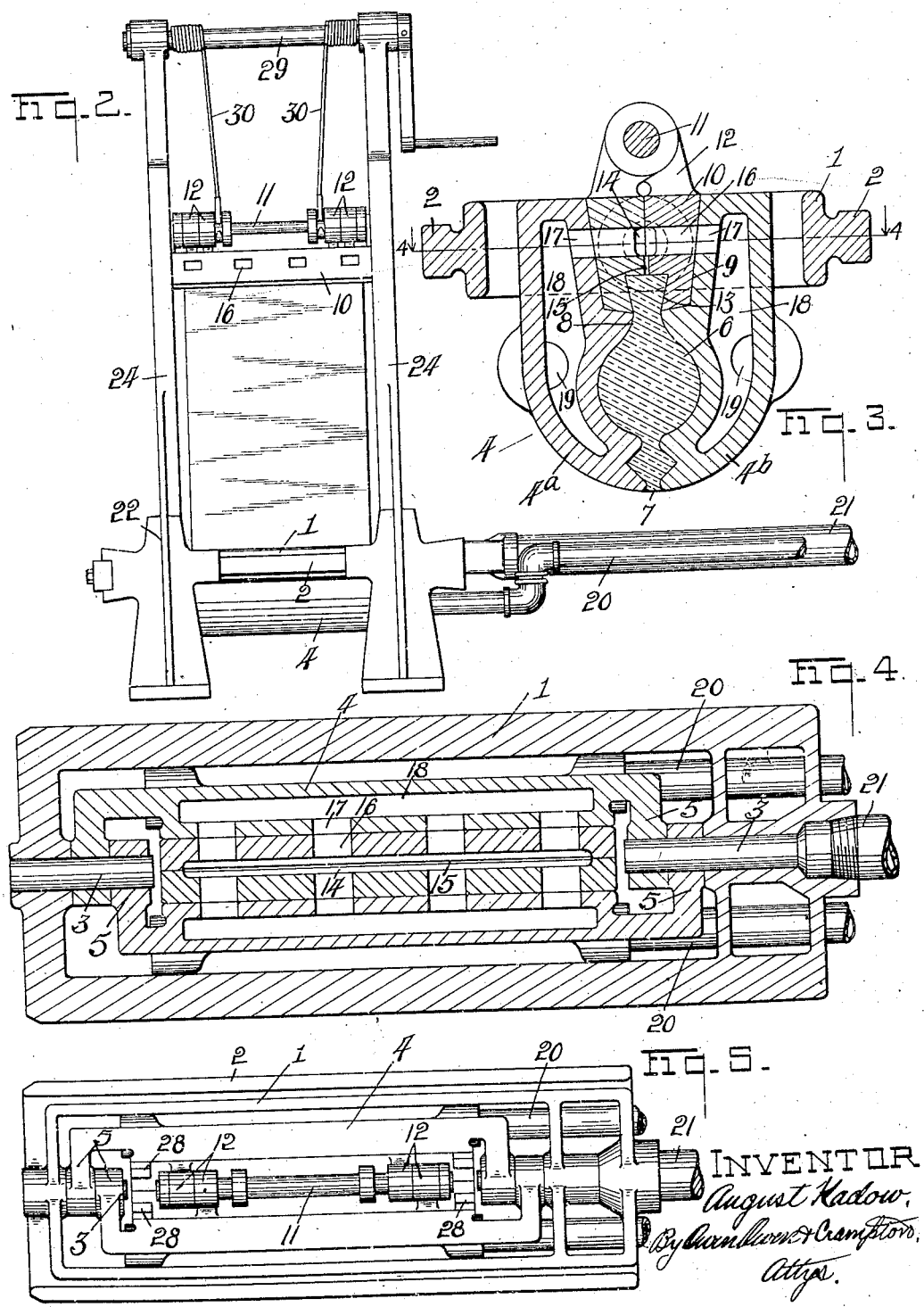
March 30, 1926.
A. KADOW
MANUFACTURE OF GLASSWARE
Filed March 27, 1922   2 Sheets-Sheet 2
1,578,442

Patented Mar. 30, 1926.

1,578,442

UNITED STATES PATENT OFFICE.

AUGUST KADOW, OF TOLEDO, OHIO, ASSIGNOR TO THE LIBBEY GLASS MANUFACTURING COMPANY, OF TOLEDO, OHIO, A CORPORATION OF OHIO.

MANUFACTURE OF GLASSWARE.

Application filed March 27, 1922. Serial No. 547,011.

*To all whom it may concern:*

Be it known that I, AUGUST KADOW, a citizen of the United States, and a resident of Toledo, in the county of Lucas and State of Ohio, have made an Invention Appertaining to the Manufacture of Glassware; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the manufacture of glassware, and particularly to the manufacture of sheet glass by drawing the same from a gathered mass of molten glass.

The object of the invention is the provision of a simple and efficient method and apparatus for forming molten glass in sheet form of desired lengths, and consists primarily in gathering a predetermined quantity of molten glass and then drawing the glass in sheet form from the gathering head except for a portion of the glass which is preferably anchored to the head. Other objects and advantages of the invention will be apparent from the following detailed description thereof.

While the method embodying the invention is capable of being practiced by the use of numerous apparatus, a preferred apparatus for practicing the same is illustrated in the accompanying drawings, in which,—

Figure 1 is a vertical cross-section of an apparatus with the gathering head mounted in the drawing frame and with the bait in the act of drawing glass in sheet form from the head, portions of the frame being broken away. Fig. 2 is a reduced side elevation thereof with the bait raised a greater extent than in Fig. 1. Fig. 3 is an enlarged cross-section of the gathering head and bait in assembled relation and with a gather of glass therein. Fig. 4 is a horizontal section on the line 4—4 in Fig. 3, and Fig. 5 is a plan view thereof.

Referring to the drawings, 1 designates a rectangular frame having parallel external guide rails or portions 2 along the opposite sides thereof for the purpose hereinafter described, and having axially aligned bearing studs 3 projecting inward from opposite ends thereof.

A suction gathering head 4 is carried by the frame 1 and comprises two opposed sections or halves 4ᵃ and 4ᵇ having lapping arms 5 projecting from their ends at or adjacent to their upper edges and provided with aligned openings for receiving the bearing studs 3. The inner faces of the head sections fit tightly against each other and cooperate to form a glass gathering cavity 6 preferably of elongated form lengthwise of the head, an inlet slot or passage 7 at the bottom of the cavity, and a restricted outlet slot or passage 8 at the top of the cavity, half of the cavity and of the inlet and outlet passages being formed in each section. The passage 8 opens into the bottom of a cavity 9 formed in the upper portion of the head, the ends of this cavity being opened at the ends of the head and the side walls being tapered to broaden the cavity outward from its bottom.

A bait 10 of tapered complemental form to the cavity 9 is intended to fit closely into such cavity and comprises two opposed sections or halves, which are hingedly connected together at their tops by a pivot-rod 11 projecting through bearing lugs 12, which extend upward in side lapping relation from the tops of the respective sections. The inner faces of the bait sections closely fit together to form a tight joint and cooperate to form a bottom cavity 13 which corresponds in length to the gathering head passage 8 and registers with or forms a continuation of said passage when the bait is seated in the cavity 9 as shown in Fig. 3. The bait cavity 13 is broader at its top than at its bottom portion to adapt it to have a gripping action on a body of glass disposed therein to prevent a withdrawal of the glass from the bait when the bait is raised relative to the gathering head to apply a stretching tension to the glass, as hereinafter described.

The meeting faces of the bait sections also cooperate to form a suction cavity or space 14 above the cavity 13 and a narrow slot or suction passage 15 between the cavities 13 and 14. Each bait section has a plurality of passages or ports 16 leading laterally therethrough from the cavity 14 and adapted when the bait is seated in the cavity 9 to register with ports 17 leading from the sides of the cavity 9 to suction chambers 18 provided in the respective gathering head sections. Each suction chamber 18 is in communication with a suitable suction or vacuum creating means through a passage 19 and conduit 20. The frame 1 has a handle 21 projecting from one end thereof, in the present instance, between the conduits 20, 20 and facilitates a handling of the frame and parts carried thereby.

It is evident that a gather of glass is drawn into the head 4 and bait 10 by submerging the inlet passage 7 in molten glass, so that the vacuum action within the head and bait combined with the atmospheric pressure on the surface of the glass in the gathering source will cause a quantity of glass to be quickly forced up into the head to fill the cavity 6 therein, the cavity 13 in the bait, and the passages 7 and 8. The bait 10 is then drawn upward from the gathering head while the glass in the latter is still in a molten drawing condition, thereby causing the glass to be drawn upward from the gathering head through the outlet passage 8 in sheet form due to the adherence of the glass to the bait, which adherence is facilitated by the gripping action of the side walls of the bait cavity 13 thereon. The thickness of the glass sheet is gauged by the width of the outlet passage 8, the consistency of the glass, and the speed of drawing movement of the bait, as is apparent to persons skilled in the art. It is preferable to cause the inlet passage 7 of the head to have anchoring or gripping coaction with the glass disposed thereon so that the glass gather will be anchored at its lower end against upward movement, thereby resisting the stretching or drawing out action applied to the gather by the movement of the bait. This is accomplished in the present instance by providing the inlet passage 7 with side recesses so that the glass in the passage interengages with the walls thereof. In practice the gathering head should be heated to pervent a chilling of a glass gather when drawn therein, and the bait while heated to some extent should not be heated to the same extent as the head as it is desirable to chill the molten glass within the bait cavity 13 to prevent the glass being drawn out of such cavity when the bait is drawn outward from the head. When a sheet of desired length has been formed from the glass gather the head 4 is opened by an outward movement of its sections to release the lower end of the sheet and the bait 10 is opened by an outward movement of its sections to release the upper end of the sheet.

To facilitate the drawing action, the frame 1 is mounted in a stretching frame 22, which is provided in opposite sides with guide-ways 23 for receiving the guide rails 2 of the frame 1. The frame 22 and guides 23 are open at one end to permit an insertion of the frame 1 therein or a removal of the same therefrom. Standards 24 rise from the frame 22 over opposite end portions of the frame 1 when disposed therein and each is provided in its inner sides with a vertical guide-way 25, which is open at its bottom to the space 26 of the frame 22 in which the frame 1 is mounted and has its upper end broadened at each side into an enlargement 27. The guide-ways 25 of the two uprights 24 are in vertical register with the respective ends of the bait 10 so that the bait may be guided by the standards in its vertical movements. The bait 19 is provided at each end with a pair of upwardly extending lugs 28, one on each section of the bait, which lugs engage the opposite side walls of the respective guide-way 25, as shown in Fig. 1, and prevent an opening movement of the bait sections and consequent releasing of the glass engaged thereby. When the bait has been raised into the guide-way enlargements 27 at the upper ends of the guide-ways the gate sections thereof are permitted to open and release the glass. The lower ends of the guide-ways 25 are disposed slightly above the lugs 28, when the bait is seated in the gathering head, so that the bait has a slight upward movement before being engaged and locked against opening movements by the side wall of the guide-ways. During such movement, however, the side walls of the cavity 9 prevent an opening movement of the bait sections sufficient to release the glass.

The bait raising means is conventionally shown as comprising a windlass shaft 29 journaled in the upper ends of the standards 24 and having cables 30 winding thereon and in releasing connection at their outer ends with the pivot rod 11 of the bait. It is evident in the use of my invention that the bait 10 forms a part of the gathering head during the gathering action and also provides the communication between the gathering cavity 6, 8, 13 of the gathering head and the suction chambers 18, and that the bait and inlet end portion of the gathering head have gripping coaction with opposite end portions of the glass contained in the head so that relative outward movements of the bait and head will cause a stretching action, to be imparted to the glass to draw it into predetermined sheet form. The length of the sheet drawn depends on the quantity of glass in the gathering head and the thickness and width of the sheet.

I wish it understood that my invention is not limited to the particular method described, or to the particular means illustrated and described for practicing the same, as both are capable of numerous modifications and changes without departing from the spirit of the claims.

Having thus described my invention, what

I claim as new, and desire to secure by Letters Patent, is,—

1. The method of forming glassware, which consists in gathering from a source of supply a quantity of molten glass into a gathering member, removing the charged gathering member from the source of supply, holding one portion of the glass in the gathering member and applying a stretching pull to another portion of the glass to draw it in predetermined form from the gathering member.

2. The method of forming glassware, which consists in gathering from a source of supply a quantity of molten glass by suction action into a gathering head, removing the charged gathering head from the source of supply, and then drawing the glass while soft from the head in predetermined shape.

3. The method of forming glassware, which consists in gathering from a source of supply a quantity of molten glass by suction into a gathering head having a restricted outlet passage, removing the charged gathering head from the source of supply, and then drawing the glass while still soft from the gathering head through the outlet passage to stretch it into predetermined shape.

4. The method of forming glassware, which consists in gathering from a source of supply a quantity of molten glass by suction action into a gathering head having a restricted outlet passage, removing the charged gathering head from the source of supply, and then drawing the glass while still soft from the gathering head through the outlet passage to stretch it into predetermined shape, the gathering glass having a portion anchored to the gathering head.

5. The method of forming glassware, which consists in drawing a quantity of molten glass by suction from a source of supply into a gathering head with opposed portions of the gathered glass gripped by different relatively movable portions of the gathering head, removing the charged gathering head from the source of supply, and while the glass is still soft relatively moving the different glass engaging parts of the head to stretch the gathered glass into predetermined form.

6. The method of forming glassware, which consists in gathering from a source of supply a quantity of molten glass in a hot gathering head, removing the charged gathering head from the source of supply and then relatively moving different parts of the gathering head having gripping engagement with the gathered glass to stretch the glass while still soft into predetermined shape.

7. The method of forming glassware, which consists in gathering from a source of supply a quantity of molten glass by suction in a gathering head and simultaneously drawing a portion of the glass into holding engagement with a bait, removing the charged gathering head from the source of supply, then relatively moving the bait and gathering head to apply a stretching action to the glass while still soft to form it into predetermined shape.

8. The method of forming sheet glass, which consists in drawing a quantity of molten glass by suction into a gathering head having a restricted inlet passage with recessed glass anchoring sides and a restricted outlet passage, and while the glass is still soft separating parts of the gathering head in engagement with the glass to draw the glass from the gathering head through the restricted outlet passage in predetermined sheet form.

9. An apparatus for forming drawn glassware, having a movable gathering head into which molten glass is drawn by suction action, a part of the head forming a bait in engagement with the gather and being movable relative to the other part of the head to cooperate therewith to stretch the gathered glass in predetermined form.

10. In an apparatus of the class described, a movable gathering head having a cavity therein for containing molten glass, a bait having a cavity forming a continuation of the glass gathering cavity, said bait and head being relatively movable to stretch glass contained in the cavity into predetermined form.

11. In an apparatus of the class described, a movable suction gathering head having a gathering cavity therein with inlet and outlet passages, a bait cooperating with the head to form the outlet passage and movable relative to the head to draw glass from the gathering cavity through the outlet passage in predetermined form.

12. In an apparatus of the class described, a gathering head having separable sections forming a gathering cavity, and inlet and outlet passages to and from the same, and a bait for closing the outlet passage of the head and having a cavity in register therewith, the head and bait having provision for the suction of molten glass therein and the two being relatively movable to draw the glass while soft in predetermined shape from the head cavity through its outlet passage.

13. In an apparatus of the class described, means forming a movable combined suction head and bait and cooperating to form a gathering cavity for molten glass, the bait and gathering head being relatively movable to stretch glass contained in the head into predetermined shape.

14. In an apparatus of the class described, means forming a combined gathering head and bait, and cooperating to form a cavity having a restricted inlet neck portion and a restricted outlet neck portion, the latter extending into the bait, said means having provision for creating a suction in the cavity through the bait, the bait and head being relatively movable to stretch glass contained in the cavity into predetermined shape.

15. In an apparatus of the class described, a gathering head having a gather receiving cavity with inlet and outlet passage and a bait receiving cavity in communiction with the outlet passage, a bait removably mounted in the bait receiving cavity of the head and having a glass receiving cavity in communication with the outlet passage of the head cavity, the bait cavity having communication with a suction creating source, and the bait and head being operable to stretch the gathering glass in predetermined form.

16. In an apparatus of the class described, means forming a gathering head and bait cooperating to form a gathering cavity which extends into the bait, said cavity having communication with a suction creating source, the bait and head being operable to stretch glass contained in the head cavity in predetermined shape.

17. In an apparatus of the class described, a gathering head having separable parts forming a gathering cavity with inlet and outlet passages, a bait having separable glass gripping parts forming a cavity in communication with the outlet passage of the head cavity, the bait cavity having communication with a suction creating source, the bait and head being relatively movable to cause glass contained in the head cavity and extending into the bait cavity to be stretched into predetermined shape through the outlet passage of the head cavity.

18. In an apparatus of the class described, a frame, a gathering head comprising separable sections hinged to the frame and forming a gather receiving cavity, and a bait carried by the head for separation therefrom and having a cavity in communication with the cavity of the head.

19. In an apparatus of the class described, a frame, means forming a movable gathering head and bait carried by the frame and cooperating to form a gathering cavity which extends into the bait, said cavity having communication with a suction creating source, the bait and head being operable to stretch glass contained in the head cavity in predetermined shape.

20. In an apparatus of the class described, a frame, a gathering head comprising separable sections hinged to the frame with the sections cooperating to form a gather receiving cavity and communicating bait receiving cavity, and a bait mounted in the bait receiving cavity and having a cavity in communication with the gather receiving cavity, the bait being separable from the gathering head to stretch a gather of glass contained in the head in predetermined form.

21. In an apparatus of the class described, a frame, a gathering head having hinged sections carried by the frame, a bait carried by the head and cooperating therewith to form a gathering chamber, the bait and gathering head having holding engagement with spaced portions of glass drawn into the cavity, and the bait being separable from the gathering head to stretch a gather of glass in predetermined sheet form.

22. In an apparatus of the class described, a gathering head, movable means carrying the head, a bait adapted to seat in the head and cooperating therewith to form a glass gathering cavity having communication with a suction creating source, and means operable to move the bait away from the head to stretch a gather of glass contained therein in sheet form.

23. In an apparatus of the class described, a frame, a gathering head having separable sections hingedly carried by the frame and forming a gathering cavity with inlet and outlet passages and a bait receiving cavity in communication with the outlet passage, the inlet passage having recessed side walls adapted to interengage with glass contained therein, a bait for removably seating in the bait receiving cavity of the head and having a cavity in engagement with the outlet passage of the head cavity and in communication with a suction creating source, and means operable to move the bait away from the head to stretch a gather of glass contained in the head in sheet form.

24. In an apparatus of the class described, a frame, a gathering head having separable sections hingedly carried by the frame and forming a gathering cavity with inlet and outlet passages and a bait receiving cavity in communication with the outlet passage, the inlet passage having recessed side walls adapted to interengage with glass contained therein, a bait for removably seating in the bait receiving cavity of the head and having a cavity in engagement with the outlet passage of the head cavity and in communication with a suction creating source, and means operable to move the bait away from the head to stretch a gather of glass contained in the head in sheet form, the bait having hinged sections which are separable after removal from the gathering head to release glass engaged thereby.

In testimony whereof I have hereunto signed my name to this specification.

AUGUST KADOW.